(12) United States Patent
Lin et al.

(10) Patent No.: US 10,895,777 B1
(45) Date of Patent: Jan. 19, 2021

(54) DISPLAY DEVICE AND METHOD FOR ADJUSTING CHROMATICITY OF DISPLAY BEAM

(71) Applicant: Coretronic Corporation, Hsin-Chu (TW)

(72) Inventors: Yang-Ching Lin, Hsin-Chu (TW); Chung-Yang Fang, Hsin-Chu (TW); Ping-Yen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/581,606

(22) Filed: Sep. 24, 2019

(51) Int. Cl.
| | |
|---|---|
| *G02F 1/1337* | (2006.01) |
| *G02F 1/13357* | (2006.01) |
| *G02F 1/1335* | (2006.01) |
| *G02F 1/1347* | (2006.01) |
| *G02F 1/1343* | (2006.01) |

(52) U.S. Cl.
CPC ...... *G02F 1/133536* (2013.01); *G02F 1/1336* (2013.01); *G02F 1/1337* (2013.01); *G02F 1/13439* (2013.01); *G02F 1/13471* (2013.01); *G02F 1/133502* (2013.01)

(58) Field of Classification Search
CPC .......... G02F 1/133536; G02F 1/33502; G02F 1/1336; G02F 1/1337; G02F 1/13439; G02F 1/13471
See application file for complete search history.

(56) References Cited

U.S. PATENT DOCUMENTS

| | | | | |
|---|---|---|---|---|
| 5,177,629 A | * | 1/1993 | Bohannon | G02F 1/133502 |
| | | | | 349/117 |
| 6,067,136 A | * | 5/2000 | Yamaguchi | G02F 1/13362 |
| | | | | 349/96 |
| 6,646,696 B1 | * | 11/2003 | Walsh | G02F 1/1336 |
| | | | | 349/65 |
| 9,857,624 B2 | * | 1/2018 | Zhang | G02F 1/133514 |
| 10,126,575 B1 | | 11/2018 | Robinson et al. | |

(Continued)

FOREIGN PATENT DOCUMENTS

| | | |
|---|---|---|
| TW | 200305039 | 10/2003 |
| TW | 200844616 | 11/2008 |

OTHER PUBLICATIONS

"Office Action of Taiwan Counterpart Application", dated Jun. 19, 2020, p. 1-p. 5.

*Primary Examiner* — Anabel Ton
(74) *Attorney, Agent, or Firm* — JCIPRNET

(57) ABSTRACT

A display device and a method for adjusting a chromaticity of a display beam are provided. A display device includes a light source module, a viewing angle switching module and a display module. The light source module includes a light source used for providing a light beam, and an illumination beam is formed by the light beam through the light source module, wherein the chromaticity of the light beam falls within a first region in the CIE 1931 xy chromaticity coordinates. The first region is a region enclosed by four coordinate points, and values of the four coordinate points of the first region are (0.2535, 0.2160), (0.2656, 0.2590), (0.2795, 0.2590), and (0.2674, 0.2160), respectively. The viewing angle switching module and the display module are located on the transmission path of the illumination beam.

9 Claims, 7 Drawing Sheets

(56) References Cited

U.S. PATENT DOCUMENTS

| | | | |
|---|---|---|---|
| 2005/0179828 A1* | 8/2005 | Hoshino | G02F 1/133514 349/21 |
| 2006/0012736 A1* | 1/2006 | Nishino | G02F 1/133555 349/114 |
| 2006/0170844 A1* | 8/2006 | Yuuki | G02F 1/1336 349/114 |
| 2008/0273145 A1* | 11/2008 | Akiyama | G09G 3/3611 349/84 |
| 2012/0105771 A1* | 5/2012 | Oka | H04N 13/315 349/67 |
| 2013/0141654 A1* | 6/2013 | Lee | H04N 13/31 349/15 |
| 2015/0077667 A1* | 3/2015 | Lee | G02B 30/27 349/15 |
| 2016/0097943 A1 | 4/2016 | Mimura et al. | |
| 2016/0170114 A1* | 6/2016 | Watano | G02F 1/133603 349/69 |
| 2017/0062668 A1* | 3/2017 | Yoshimura | C09K 11/0883 |
| 2019/0072818 A1* | 3/2019 | Jung | G02F 1/133555 |
| 2020/0002611 A1* | 1/2020 | Ohishi | C09K 19/12 |
| 2020/0089000 A1* | 3/2020 | Hayashi | C09K 11/7734 |

* cited by examiner

DISPLAY DEVICE AND METHOD FOR ADJUSTING CHROMATICITY OF DISPLAY BEAM

BACKGROUND OF THE INVENTION

1. Field of the Invention

The present invention relates to an optical device and a method for adjusting a chromaticity, and in particular, to a display device and a method for adjusting a chromaticity of a display beam.

2. Description of Related Art

With the development of technology, display devices have become common electronic devices in daily life, and some display devices will provide an anti-peep function to maintain the viewing privacy of users at present. Moreover, since a liquid crystal display and an electronically controlled liquid crystal viewing angle switcher in a current anti-peep display device need to be matched with polarizers to control the transmittance of visible light, the anti-peep display device at least needs three polarizers to achieve the anti-peep effect.

However, since the number of used polarizers will affect the chromaticity of a display beam provided by the display device, compared to a display device that generally uses two polarizers, the anti-peep display device will cause a yellow color shift in the chromaticity of the display beam provided by the anti-peep display device because using three polarizers, and then causes the chromaticity of a standard white light display beam to be biased to an upper limit or exceed the specification requirement.

There are two methods for adjusting the chromaticity of a display beam provided by an anti-peep display device at present. One is to adjust a film thickness of a transparent electrode (ITO) of the electronically controlled liquid crystal viewing angle switcher in the anti-peep display device to correct the color shift caused by multiple layers of polarizers. The other one is to adjust the pigment concentration of each primary color of a color filter of the liquid crystal display in the anti-peep display device to correct the color shift caused by the multiple layers of polarizers. However, the two methods are complicated in technique, and the effects are not significant. For example, the method of adjusting the film thickness of the transparent electrode (ITO) is liable to cause the transmittance of the electronically controlled liquid crystal viewing angle switcher to be lowered, and the method of adjusting the pigment concentration of each primary color of the color filter may affect the transmittance of three primary colors and the color gamut, and therefore, the image quality of an image of the anti-peep display device will still be affected.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The present invention provides a display device, which can provide an anti-peep function and has an image with high image quality.

The present invention provides a method for adjusting a chromaticity of a display beam, which can enable an image of a display device with an anti-peep function to have high image quality.

Other objectives and advantages of the present invention may be further understood from the technical features disclosed in the present invention.

In order to achieve one or part or all of the aforementioned objectives or other objectives, one embodiment of the present invention provides a display device. The display device includes a light source module, a viewing angle switching module and a display module. The light source module includes a light source. The light source is used for providing a light beam, and an illumination beam is formed by the light beam through the light source module. The chromaticity of the light beam falls within a first region in CIE 1931 xy chromaticity coordinates. The first region is a region enclosed by connecting lines of four coordinate points, and values of these coordinate points of the first region are respectively (0.2535, 0.2160), (0.2656, 0.2590), (0.2795, 0.2590), and (0.2674, 0.2160). The viewing angle switching module is disposed on a transmission path of the illumination beam, and includes a first polarizer, a viewing angle adjusting layer and a second polarizer. The viewing angle adjusting layer is located between the first polarizer and the second polarizer. The display module is disposed on the transmission path of the illumination beam, and includes a display layer and a third polarizer. The display layer is located between the second polarizer and the third polarizer, and a display beam is formed by the illumination beam through the viewing angle switching module and the display module.

In one embodiment of the present embodiment, the chromaticity of the light beam falls within a second region in the CIE 1931 xy chromaticity coordinates. The second region is a region enclosed by connecting lines of four coordinate points, and values of these coordinate points of the second region are respectively (0.2565, 0.2260), (0.2630, 0.2490), (0.2765, 0.2490) and (0.2700, 0.2260).

In one embodiment of the present embodiment, the chromaticity of the light beam falls within a third region in the CIE 1931 xy chromaticity coordinates. The third region is a region enclosed by connecting lines of four coordinate points, and values of these coordinate points of the third region are respectively (0.2580, 0.2310), (0.2615, 0.2440), (0.2750, 0.2440) and (0.2715, 0.2310).

In one embodiment of the present embodiment, the chromaticity of the display beam falls within a standard region in the CIE 1931 xy chromaticity coordinates when the display beam is a white light. The standard region is a region enclosed by connecting lines of four coordinate points, and values of these coordinate points of the standard region are respectively (0.343, 0.359), (0.283, 0.359), (0.343, 0.299) and (0.283, 0.299).

In one embodiment of the present embodiment, a hue of at least one of the first polarizer, the second polarizer, and the third polarizer has a b* value in a CIE 1976 (L*, a*, b*) color space and the b* value is less than 1.

In one embodiment of the present embodiment, the b* value ranges from −2.5 to 0.5.

In one embodiment of the present embodiment, a hue of the first polarizer has a b* value in the CIE 1976 (L*, a*, b*) color space and the b* value is less than 1.

In one embodiment of the present embodiment, the illumination beam sequentially passes through the viewing angle switching module and the display module to form the display beam, and the viewing angle switching module is used for changing a range of an emitted light viewing angle of the illumination beam, thereby changing a range of an emitted light viewing angle of the display beam.

In one embodiment of the present embodiment, the illumination beam sequentially passes through the display module and the viewing angle switching module to form the display beam, and the viewing angle switching module is used for changing a range of an emitted light viewing angle of the display beam.

In order to achieve one or part or all of the aforementioned objectives or other objectives, one embodiment of the present invention provides a method for adjusting a chromaticity of a display beam, including the following steps: providing a light source module, a viewing angle switching module and a display module, wherein the light source module includes a light source, the viewing angle switching module includes a first polarizer, a viewing angle adjusting layer, and a second polarizer, and the display module includes a display layer and a third polarizer; and providing a light beam, wherein the light beam is provided by the light source, and the chromaticity of the light beam falls within a first region in the CIE 1931 xy chromaticity coordinates; the first region is a region enclosed by connecting lines of four coordinate points, and values of these coordinate points of the first region are respectively (0.2535, 0.2160), (0.2656, 0.2590), (0.2795, 0.2590), and (0.2674, 0.2160), thereby enabling the light beam to form a display beam through the light source module, the viewing angle switching module and the display module; the chromaticity of the display beam falls within a standard region in the CIE 1931 xy chromaticity coordinates; and the standard region is a region enclosed by connecting lines of four coordinate points, and values of these coordinate points of the standard region are respectively (0.343, 0.359), (0.283, 0.359), (0.343, 0.299) and (0.283, 0.299) when the display beam is a white light.

Based on the above, the embodiments of the present invention at least have one of the following advantages or effects. In the embodiments of the present invention, the display device and the method for adjusting the chromaticity of the display beam can enable the chromaticity coordinate of the display beam provided by the display device to be located near the center of the standard region in the CIE 1931 xy chromaticity coordinates by controlling the chromaticity of the light beam provided by the light source and the hues of the polarizers used, so that the display device has good color performance and then can provide both the anti-peep function and an image with high image quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
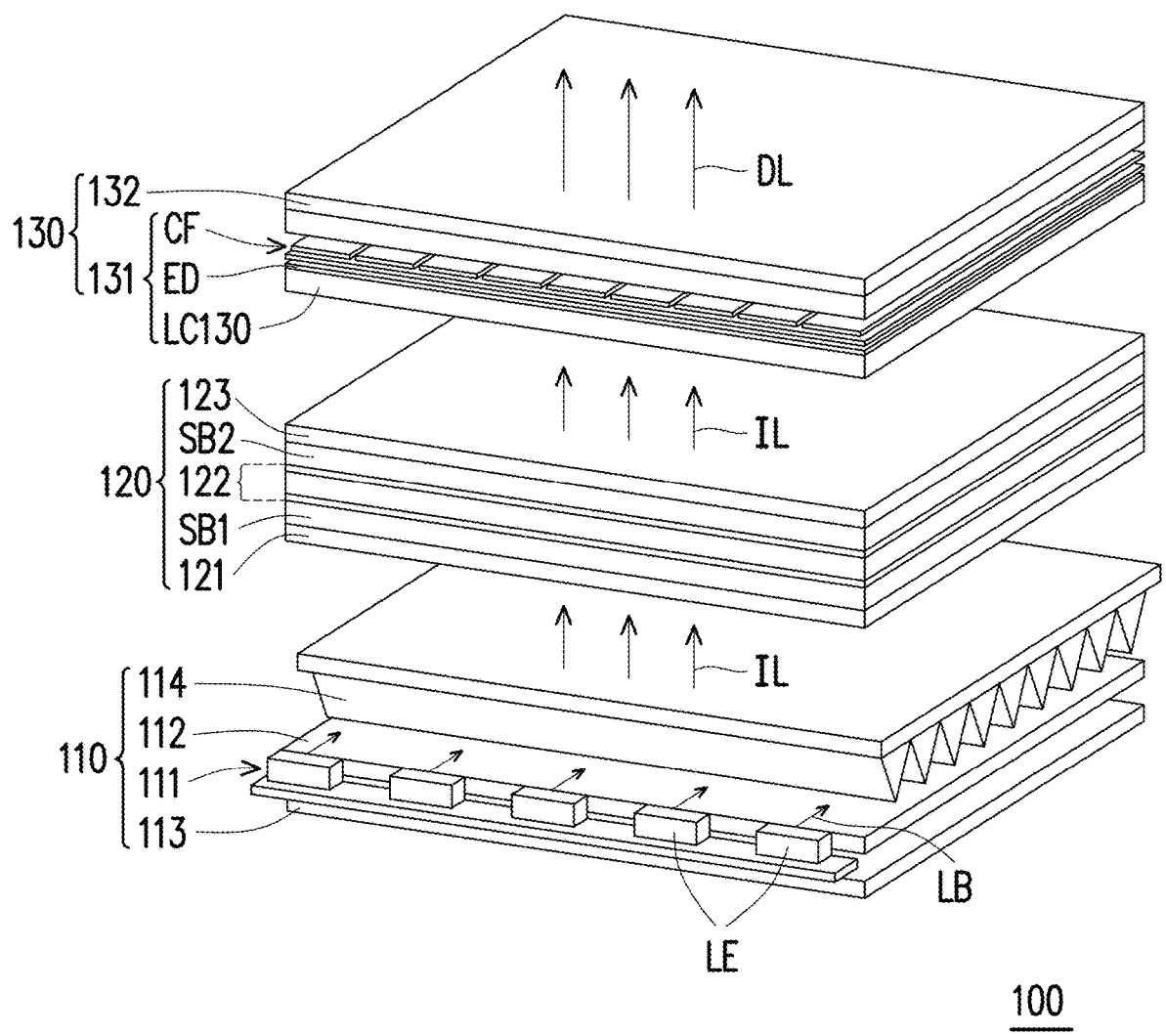
FIG. 1A is a structural schematic diagram of a display device of one embodiment of the present invention.
Figure 1B:
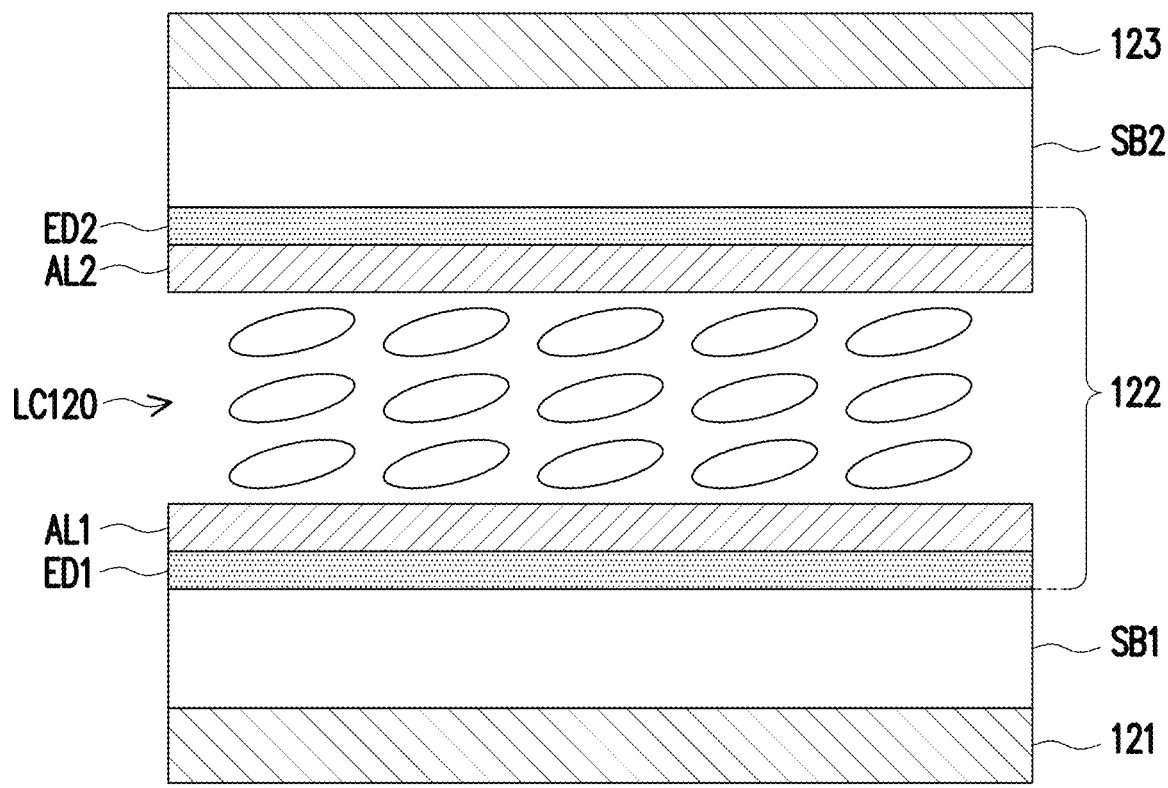
FIG. 1B is a structural schematic diagram of a viewing angle switching module of one embodiment of the present invention.
Figure 1C:
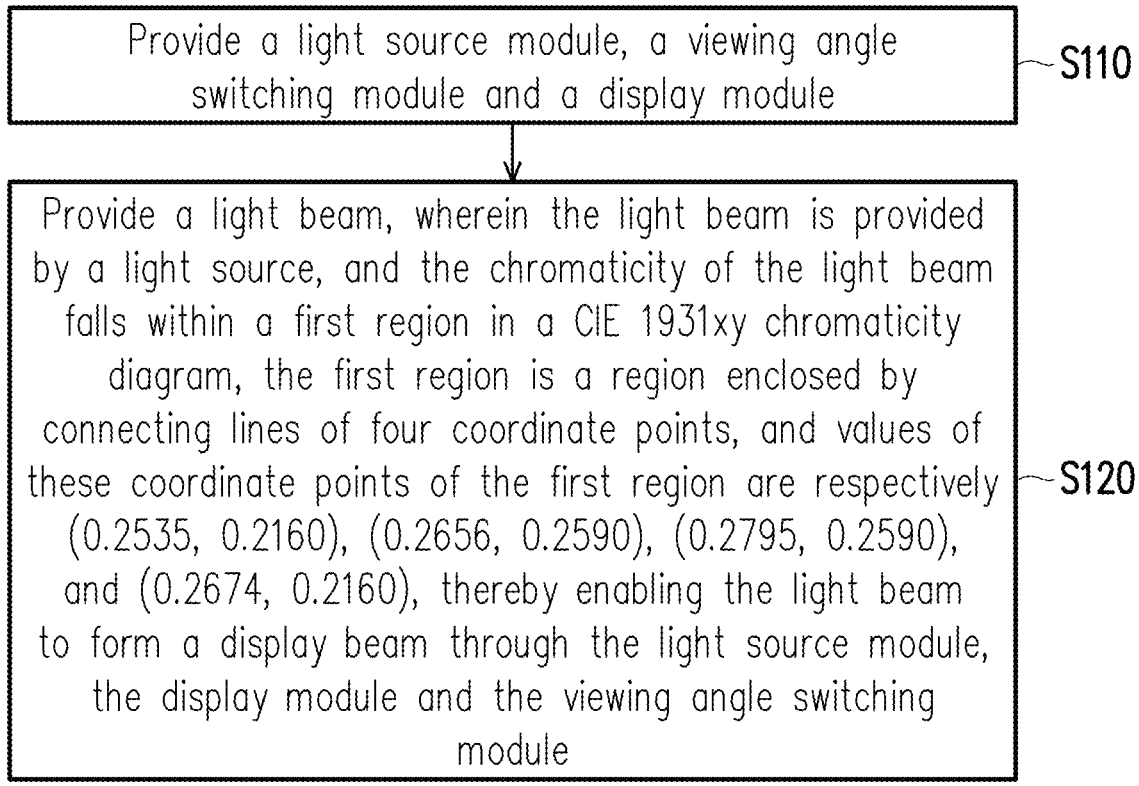
FIG. 1C is a flow chart of a manufacturing method of a display device of one embodiment of the present invention.

FIG. 1A is a structural schematic diagram of a display device of one embodiment of the present invention. FIG. 1B is a structural schematic diagram of a viewing angle switching module of one embodiment of the present invention. FIG. 1C is a flow chart of a manufacturing method of a display device of one embodiment of the present invention. Referring to FIG. 1A, the display device 100 of the present embodiment includes a light source module 110, a viewing angle switching module 120 and a display module 130. The light source module 110 includes a light source 111, the light source 111 is used for providing a light beam LB, and an illumination beam IL is formed by the light beam LB through the light source module 110. The illumination beam IL sequentially passes through the viewing angle switching module 120 and the display module 130 to form a display beam DL. In other words, in the present embodiment, the viewing angle switching module 120 is disposed between the light source module 110 and the display module 130. Specifically, The viewing angle switching module 120 is used for switching a range of an emitted light viewing angle of the illumination beam IL, thereby changing a range of an emitted light viewing angle of the display beam DL, so that at least two different viewing angle ranges can be provided, such as a normal viewing mode with a wide viewing angle and an anti-peep mode with a narrow viewing angle.

Specifically, as shown in FIG. 1A, in the present embodiment, the light module 110 includes the light source 111, a light guide plate 112, a low-scattering reflector plate 113 and an inverse prism sheet 114. The light source 111 may be composed of a plurality of light emitting elements LE, and may provide a light beam LB. Further, in the present embodiment, after entering the light guide plate 112, the light beam LB provided by the light source 111 may be reflected by the reflector plate 113 to change a propagation direction, then is collimated by the inverse prism sheet 114, and leaves the light source module 110 to form an illumination beam IL. In other words, in the present embodiment, the illumination beam IL has high collimation.

More specifically, as shown in FIG. 1A and FIG. 1B, in the present embodiment, the viewing angle switching module 120 and the display module 130 are disposed on a transmission path of the illumination beam IL. The viewing angle switching module 120 includes a first polarizer 121, a viewing angle adjusting layer 122, and a second polarizer 123. The viewing angle adjusting layer 122 is located between the first polarizer 121 and the second polarizer 123. The viewing angle switching module 120 further includes a first substrate SB1 and a second substrate SB2. The first substrate SB1 and the second substrate SB2 are located between the first polarizer 121 and the second polarizer 123, and the viewing angle adjusting layer 122 is located between the first substrate SB1 and the second substrate SB2. Specifically, the first substrate SB1 or the second substrate SB2 may be a general glass substrate, and the present invention is not limited thereto.

As shown in FIGS. 1A and 1B, in the present embodiment, the first polarizer 121 and the second polarizer 123 are sequentially disposed on the transmission path of the illumination beam IL. The absorption axes of the first polarizer 121 and the second polarizer 123 are arranged in parallel or are arranged approximately in parallel. For example, an included angle between the absorption axes of the first polarizer 121 and the second polarizer 123 falls within a range of 0 to 10 degrees. The viewing angle adjusting layer 122 is also disposed on the transmission path and located between the first polarizer 121 and the second polarizer 123, so as to change the range of the emitted light viewing angle of the illumination beam IL, for example, from a wide emitted light viewing angle to a narrow emitted light viewing angle.

On the other hand, as shown in FIG. 1B, in the present embodiment, the viewing angle adjusting layer 122 includes a liquid crystal layer LC120, a first alignment layer AL1, a second alignment layer AL2, a first electrode ED1, and a second electrode ED2. The first electrode ED1 and the second electrode ED2 are respectively disposed on two opposite sides of the liquid crystal layer LC120 to provide an applied voltage to the liquid crystal layer LC120 to change the orientation of liquid crystal molecules in the liquid crystal layer LC120. The liquid crystal molecules of the liquid crystal layer LC120 are, for example, Twisted Nematic (TN) liquid crystals, but are not limited. The first alignment layer AL1 and the second alignment layer AL2 are also respectively disposed on two opposite sides of the liquid crystal layer LC120. The first alignment layer AL1 is located between the first electrode ED1 and the liquid crystal layer LC120, and the second alignment layer AL2 is located between the liquid crystal layer LC120 and the second electrode ED2. The alignment directions of the second alignment layer AL2 and the first alignment layer AL1 are antiparallel or approximately antiparallel to each other. In addition, the first alignment layer AL1 is disposed between the liquid crystal layer LC120 and the first polarizer 121, and the second alignment layer AL2 is disposed between the liquid crystal layer LC120 and the second polarizer 123. The absorption axis direction of the first polarizer 121 or the second polarizer 123 is parallel or perpendicular or approximately parallel or perpendicular to the alignment direction of the corresponding first alignment layer AL1 or second alignment layer AL2.

In this way, the liquid crystal molecules in the liquid crystal layer LC120 may change their orientation according to the applied voltage between the first electrode ED1 and the second electrode ED2 to change the emitted light viewing angle of the illumination beam IL. For example, when the applied voltage is equal to 0 V(volt), the illumination beam IL has a small difference in the light intensity at each angle after penetrating the viewing angle adjusting layer 122, and the illumination beam IL required for each viewing angle of the display device 100 can be provided, so that the display device 100 has a wide viewing angle and is in the normal viewing mode. When a first applied voltage is more than 0 V(for example, ±3 V), the illumination beam IL may be affected by the liquid crystal molecules when penetrating the viewing angle adjusting layer 122, and then a polarization state is changed, thereby changing an emitted light field type, which may provide an illumination beam IL required for a narrow emitted light viewing angle of the display device 100 to significantly narrow the viewing angle range. In this way, the range of the emitted light viewing angle of the display beam DL subsequently formed by the illumination beam IL through the display module 130 may be significantly narrowed as well. In this way, at this time, others beside cannot see an image of the display device 100 clearly, so that the display device 100 is in the anti-peep mode, and has an effect of protecting the privacy. In addition, it should be noted that when the first applied voltage is more than 0 V, a front viewing angle (a viewing angle in a direction perpendicular to the display module 130) is hardly affected by the liquid crystal molecules, so that a viewer in the normal direction can still see an image with high display image quality.

More specifically, as shown in FIG. 1A, in the present embodiment, the display module 130 includes a display layer 131 and a third polarizer 132. The display layer 131 is located between the second polarizer 123 and the third polarizer 132. For example, the display layer 131 includes a liquid crystal layer LC130, an electrode layer ED, and a color filter CF. The color filter CF has photoresists in three colors: red, green and blue. Furthermore, the third polarizer 132 and the second polarizer 123 are disposed on two opposite sides of the display layer 131, and the absorption axis directions between the third polarizer 132 and the second polarizer 123 are parallel or perpendicular to each other. In other words, in the present embodiment, the display module 130 is a liquid crystal display panel, and the second polarizer 123 and the third polarizer 132 can be used as upper and lower polarizers of the display module 130, but the present invention is not limited thereto.

As shown in FIG. 1A and FIG. 1B, in the present embodiment, the illumination beam IL can form the display beam DL after passing through the viewing angle switching module 120 and the display module 130. In addition, as described above, in the present embodiment, the viewing angle switching module 120 adjusts the range of the emitted light viewing angle of the illumination beam IL, thereby switching the range of the emitted light viewing angle of the display beam DL of the display module 130, so that the display device 100 may be switched between the normal viewing mode and the anti-peep mode according to the applied voltage.

Figure 2A:
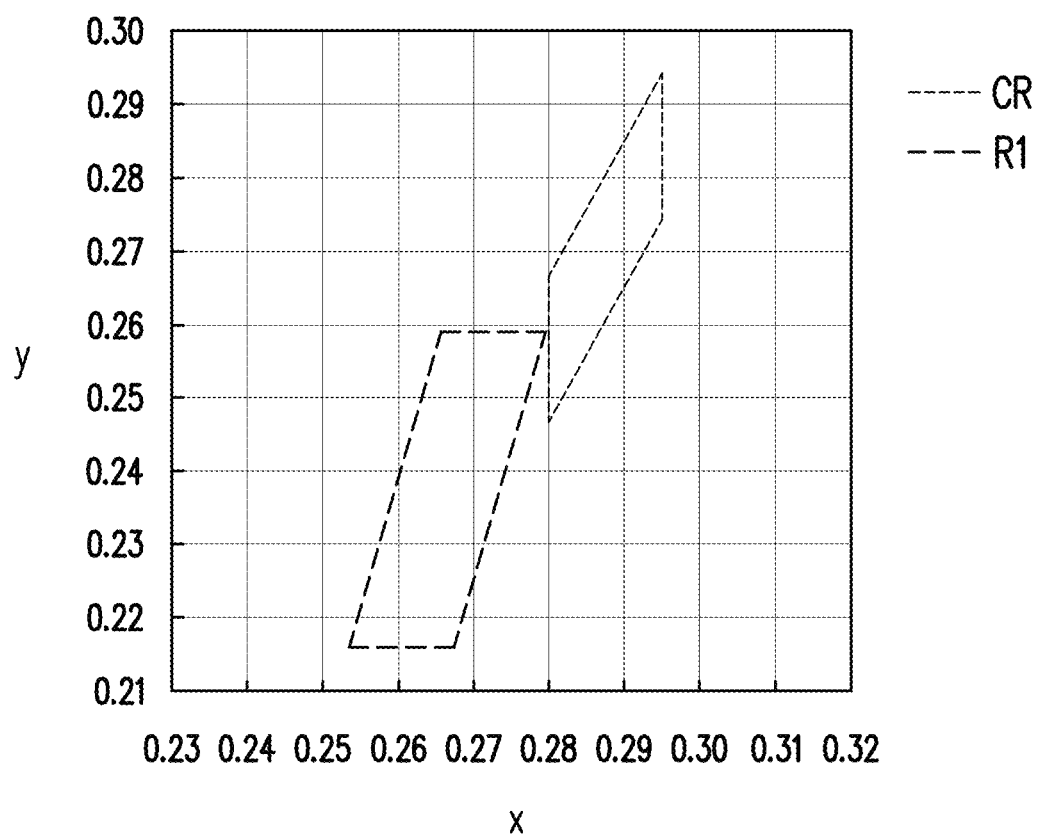
FIG. 2A is a schematic diagram of ranges of light beams in a CIE 1931 xy chromaticity coordinates according to one embodiment of the present invention and one comparative example.

However, in the present embodiment, the display device 100 uses three polarizers to implement the anti-peep function of the display device 100, and the number of the used polarizers may affect the chromaticity of the display beam DL provided by the display device 100. Therefore, as shown in FIG. 1C, in the present embodiment, the method for adjusting the chromaticity of the display beam DL may be implemented, for example, by the display device 100 in FIG. 1A. Specifically, Step S110 is performed: the light source module 110, the viewing angle switching module 120 and the display module 130 are provided. Step S120 is performed: the light beam LB is provided by the light source 111, the chromaticity of the light beam LB provided by the light source 111 falling within a first region R1 in a CIE 1931 xy chromaticity coordinates (as shown in FIG. 2A below). The first region R1 is a region enclosed by connecting lines of four coordinate points, and values of these coordinate points of the first region R1 are respectively (0.2535, 0.2160), (0.2656, 0.2590), (0.2795, 0.2590) and (0.2674, 0.2160), thereby forming a display beam through the light source module, the display module and the viewing angle switching module.

In this way, the chromaticity of the display beam DL is in a standard area SR in the CIE 1931 xy chromaticity coordinates when the display beam DL is a white light and the display beam DL is at the maximum gray scale brightness of the display device 100. The standard region SR is a region enclosed by connecting lines of four coordinate points, and values of these coordinate points of the standard region SR are respectively (0.343, 0.359), (0.283, 0.359), (0.343, 0.299), and (0.283, 0.299). In this way, the display device 100 may provide both the anti-peep function and an image with high image quality.

Further description will be made below in combination with FIG. 2A to FIG. 2C.

FIG. 2A is a schematic diagram of ranges of light beams in the CIE 1931 xy chromaticity coordinates according to one embodiment of the present invention and one comparative example. FIG. 2B is a schematic diagram of positions of display beams in the CIE 1931 xy chromaticity coordinates according to one embodiment of the present invention and one comparative example. FIG. 2C is a schematic diagram of different ranges of a light beam in the CIE 1931 xy chromaticity coordinates according to one embodiment of the present invention. As shown in FIG. 2A, the chromaticity of the light beam LB provided by the light source 111 of the present embodiment may fall within the first region R1 in the CIE 1931 xy chromaticity coordinates. The first region R1 is a region enclosed by connecting lines of four coordinate points, and values of these coordinate points of the first region are respectively (0.2535, 0.2160), (0.2656, 0.2590), (0.2795, 0.2590), and (0.2674, 0.2160). The chromaticity of a light beam provided by a light source applied to the general display device of the comparative example may fall within a comparative region CR in the CIE 1931 xy chromaticity coordinates. The comparative region CR is a region enclosed by connecting lines of four coordinate points as well, and values of these coordinate points of the comparative region CR are respectively (0.2950, 0.2942), (0.2950, 0.2742), (0.2800, 0.2466), and (0.2800, 0.2666). In other words, compared with the light beam provided by a light source applied to the general display device, the light beam LB provided by the light source 111 of the present embodiment is a white light biased to a cold tone (bluish).

Figure 2B:
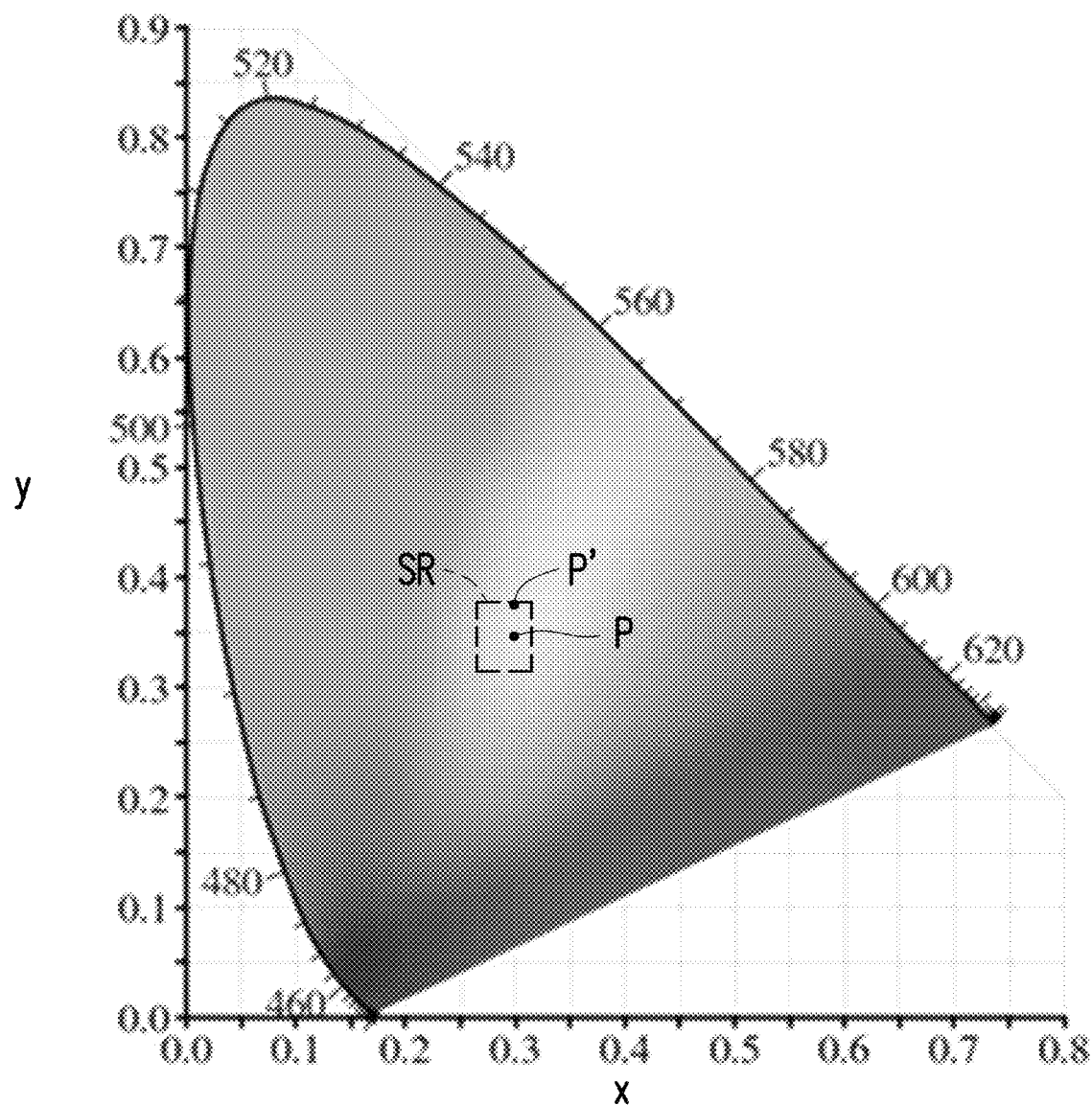
FIG. 2B is a schematic diagram of positions of display beams in the CIE 1931 xy chromaticity coordinates according to one embodiment of the present invention and one comparative example.
Figure 2C:
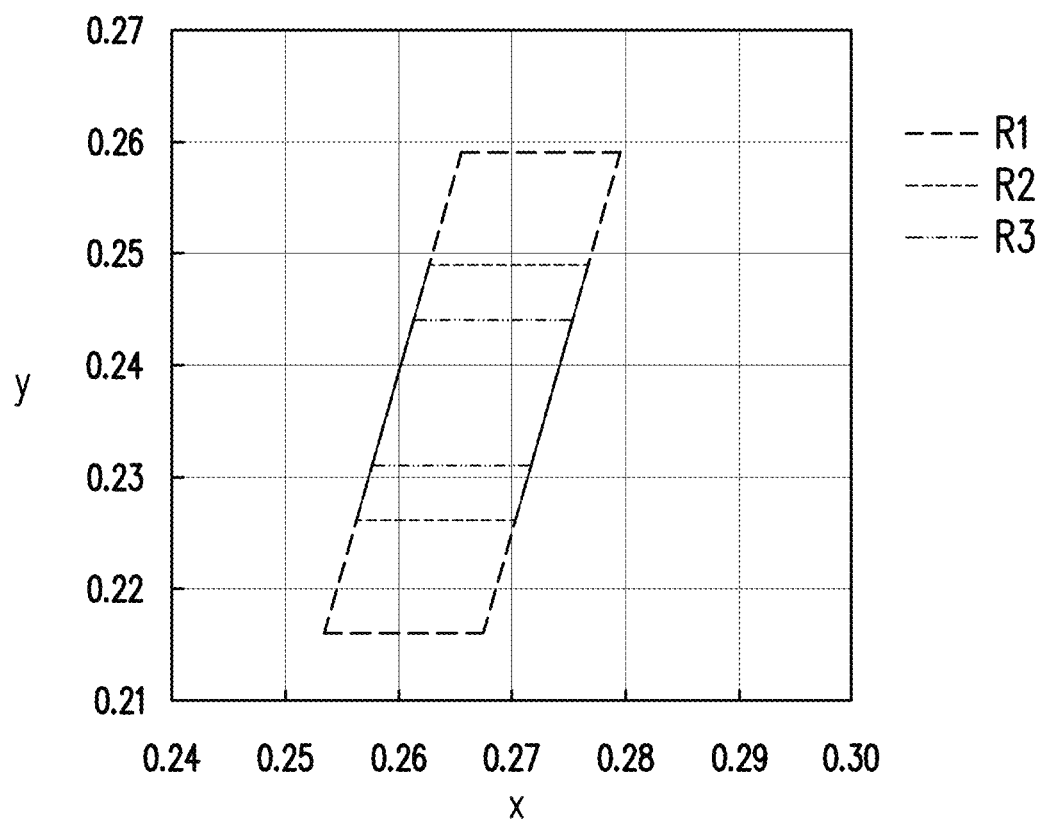
FIG. 2C is a schematic diagram of different ranges of a light beam in the CIE 1931 xy chromaticity coordinates according to one embodiment of the present invention.

In this way, as shown in FIG. 2B, when the display beam DL formed after the light beam LB passes through the light guide plate 112, the inverse prism sheet 114, the viewing angle switching module 120 and the display module 130 is the white light, and the display beam DL is at the maximum gray scale brightness of the display device 100, the chromaticity of the display beam DL of the present embodiment falls within a standard region SR in the CIE 1931 xy chromaticity coordinates. The standard region SR is a region enclosed by connecting lines of four coordinate points, and values of these coordinate points of the standard region SR are respectively (0.343, 0.359), (0.283, 0.359), (0.343, 0.299), and (0.283, 0.299). Furthermore, the chromaticity coordinate P of the display beam DL of the present embodiment is (0.322, 0.328) in the CIE 1931 xy chromaticity coordinates, and are located near the center of the standard region SR, so that the display beam DL has good color performance. On another aspect, when the display beam formed by the illumination beam provided by the comparative example is a white light and the display beam is at the maximum gray scale brightness of the display device, and the chromaticity coordinate P' of the display beam of the comparative example is (0.330, 0.353) in the CIE 1931 xy chromaticity coordinates, and is close to an edge of the standard region SR, so that the color is yellowish.

More specifically, in the comparative example, since the number of the used polarizer may affect the chromaticity of the display beam DL provided by the display device 100, the light beam provided by the light source of general display device of the comparative example is only applicable to a general display device that generally uses two polarizers. When the light beam in the general display device of the comparative example is applied to the display device that uses three polarizers, the chromaticity of the display beam provided by the anti-peep display device may have a yellow color shift, which causes the chromaticity of the display beam of the standard white light to be biased to an upper limit or exceed the specification requirement.

However, in the present embodiment, compared with the light beam provided by the general display device, the light beam LB provided by the light source 111 of the present embodiment is a white light biased to a cold tone (bluish). Therefore, the chromaticity of the display beam DL of the standard white light may be maintained near the center of the standard region SR, and the final display beam DL may provide good color performance.

It is worth mentioning that in the present embodiment, the display device 100 is exemplified by a display device having an anti-peep function, but the present invention is not limited thereto. In other embodiments, the method for adjusting the chromaticity of the display beam DL may also be applied to a display device having three or more layers of polarizers, such as a stereoscopic display device and a touch display device.

On another aspect, furthermore, in the present embodiment, the chromaticity of the light beam LB provided by the light source 111 of the present embodiment may further fall within a second region R2 in the CIE 1931 xy chromaticity coordinates. The second region R2 is a region enclosed by connecting lines of four coordinate points, and values of these coordinate points of the second region R2 are respectively (0.2565, 0.2260), (0.2630, 0.2490), (0.2765, 0.2490), and (0.2700, 0.2260). Alternatively, the chromaticity of the light beam LB provided by the light source 111 of the present embodiment may further fall within a third region R3 in the CIE 1931 xy chromaticity coordinates. The third region R3 is a region enclosed by connecting lines of four coordinate points, and values of these coordinate points of the third region R3 are respectively (0.2580, 0.2310), (0.2615, 0.2440), (0.2750, 0.2440), and (0.2715, 0.2310). In this way, the chromaticity coordinate of the display beam DL may further be located near the center of the standard region SR in the CIE 1931 xy chromaticity coordinates, so that the display beam DL has better color performance.

In addition, in the present embodiment, the display device 100 may further adjust the chromaticity coordinate of the display beam DL through the hues of the polarizers used. For example, in the present embodiment, the first polarizer 121 with a hue having a $b^*$ value less than 1 in a CIE 1976 ($L^*$, $a^*$, $b^*$) color space may be used. Since the hue characteristic of a polarizer may be regarded as a chromaticity change of an illumination beam IL after light passes through the polarizer, when the $b^*$ value of the first polarizer 121 is less than 1, the chromaticity coordinate of the display beam DL may further be located near the center of the standard region SR in the CIE 1931 xy chromaticity coordinates, and the display beam DL may have better color performance. Further, when the $b^*$ value ranges between −2.5 and 0.5, the chromaticity coordinate of the display beam DL may further be located near the center of the standard region SR in the CIE 1931 xy chromaticity coordinates, and the display beam DL has better color performance. For example, the chromaticity coordinate P of the display beam DL of the present embodiment in FIG. 1A is (0.322, 0.328) in the CIE 1931 xy chromaticity coordinates, the display device 100 may further adjust the chromaticity coordinate of the display beam DL to (0.315, 0.322) in the CIE 1931 xy chromaticity coordinates through the hues of the polarizers used. The chromaticity coordinate of the display beam DL may further be located near the center of the standard region SR in the CIE 1931 xy chromaticity coordinates.

In addition, in the present embodiment, the display device 100 is not limited to only limiting the hue range of the first polarizer 121 of the viewing angle switching module 120, and may also limit the hue range of the second polarizer 123 of the viewing angle switching module 120 or the hue range of the third polarizer 132 of the display module 130. That is, in the present embodiment, the display device 100 may also enable the hue of at least one of the first polarizer 121, the second polarizer 123 and the third polarizer 132 to have a $b^*$ value in the CIE 1976 ($L^*$, $a^*$, $b^*$) color space, and the $b^*$ value is less than 1, and, preferably, the $b^*$ value ranges between −2.5 and 0.5. In this way, the chromaticity coordinate of the display beam DL may further be located near the center of the standard region SR in the CIE 1931 xy chromaticity coordinates, and the display beam DL has better color performance.

In this way, in the embodiment of the present invention, the display device 100 and the method for adjusting the chromaticity of the display beam DL can enable the chromaticity coordinate of the display beam DL provided by the display device 100 to be located near the center of the standard region SR in the CIE 1931 xy chromaticity coordinates by controlling the chromaticity of the light beam LB provided by the light source 111 and the hues of the polarizers used, so that the display device 100 has good color performance and then can provide both the anti-peep function and an image with high image quality.

Figure 3:
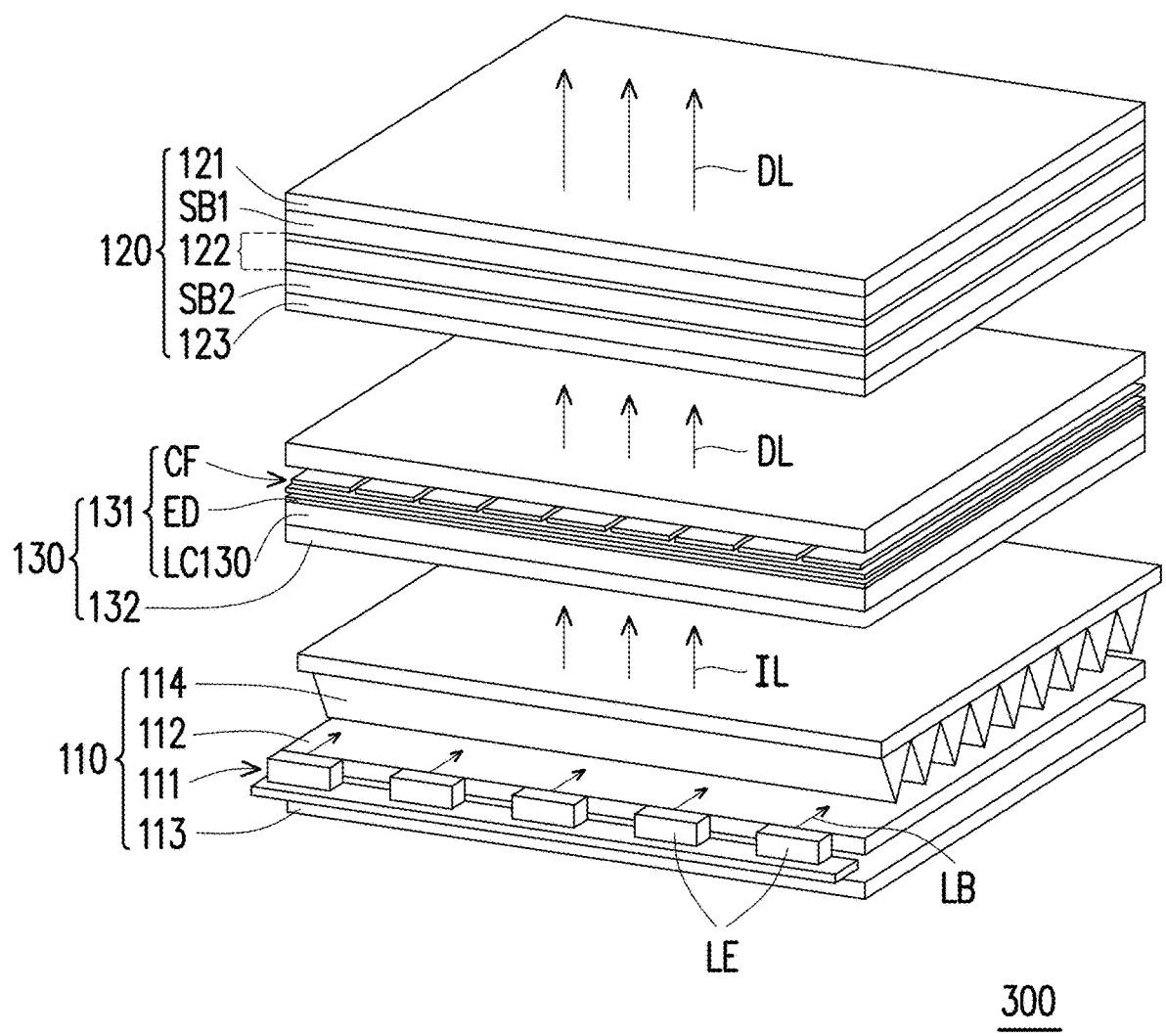
FIG. 3 is a structural schematic diagram of another display device of one embodiment of the present invention.

FIG. 3 is a structural schematic diagram of another display device according to one embodiment of the invention. A display device 300 of the present embodiment is similar to the display device 100 of FIG. 1A, and the difference is as follows. Referring to FIG. 3, in the present embodiment, a light beam LB of a light source 111 of the display device 300 sequentially passes through a light source module 110, a display module 130 and a viewing angle switching module 120 to form a display beam DL. That is, as shown in FIG. 3, the display module 130 is located between the light source module 110 and the viewing angle switching module 120. Therefore, the illumination beam IL may firstly form the display beam DL, and the viewing angle switching module 120 is used for switching a range of an emitted light viewing angle of the display beam DL to provide a normal viewing mode with a wide viewing angle and an anti-peep mode with a narrow viewing angle.

Furthermore, in the present embodiment, the display device 300 may also enable the chromaticity coordinate of the display beam DL provided by the display device 300 to be located near the center of the standard region SR in the CIE 1931 xy chromaticity coordinates by controlling the chromaticity of the light beam LB provided by the light source 111 and the hue of at least one of the used polarizers (i.e., at least one of the first polarizer 121, the second polarizer 123 and the third polarizer 132), so that the display device 300 has good color performance and then can provide both the anti-peep function and an image with high image quality. Therefore, the display device 300 may also realize functions similar to those of the display device 100, so as to achieve the effects and advantages which are similar to those of the display device 100, and the descriptions thereof are omitted herein.

Based on the above, the embodiments of the present invention at least have one of the following advantages or effects. In the embodiments of the present invention, the display device and the method for adjusting the chromaticity of the display beam can enable the chromaticity coordinate of the display beam provided by the display device to be located near the center of the standard region in the CIE 1931 xy chromaticity coordinates by controlling the chromaticity of the light beam provided by the light source and the hues of the polarizers used, so that the display device has good color performance and then can provide both the anti-peep function and the image with high image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
   a light source module includes a light source, the light source is used for providing a light beam, and an illumination beam is formed by the light beam through the light source module, wherein a chromaticity of the light beam falls within a first region in the CIE 1931 xy chromaticity coordinates, the first region is a region enclosed by four coordinate points, and values of the four coordinate points of the first region are (0.2535, 0.2160), (0.2656, 0.2590), (0.2795, 0.2590), and (0.2674, 0.2160), respectively;
   a viewing angle switching module, located on a transmission path of the illumination beam, and comprising:
      a first polarizer;
      a viewing angle adjusting layer; and
      a second polarizer, wherein the viewing angle adjusting layer is located between the first polarizer and the second polarizer; and
   a display module, located on the transmission path of the illumination beam, and comprising:
      a display layer; and
      a third polarizer, wherein the display layer is located between the second polarizer and the third polarizer, and a display beam is formed by the illumination beam through the display module and the viewing angle switching module,
   wherein a chromaticity of the display beam falls within a standard region in the CIE 1931 xy chromaticity coordinates, the standard region is a region enclosed by four coordinate points, and values of the four coordinate points of the standard region respectively are (0.343, 0.359), (0.283, 0.359), (0.343, 0.299) and (0.283, 0.299) when the display beam is a white light.

2. The display device according to claim 1, wherein the chromaticity of the light beam falls within a second region in the CIE 1931 xy chromaticity coordinates, the second region is a region enclosed by four coordinate points, and values of the four coordinate points of the second region are (0.2565, 0.2260), (0.2630, 0.2490), (0.2765, 0.2490) and (0.2700, 0.2260), respectively.

3. The display device according to claim 1, wherein the chromaticity of the light beam falls within a third region in the CIE 1931 xy chromaticity coordinates, the third region is a region enclosed by four coordinate points, and values of the four coordinate points of the third region are (0.2580, 0.2310), (0.2615, 0.2440), (0.2750, 0.2440) and (0.2715, 0.2310), respectively.

4. A display device, comprising:
   a light source module includes a light source, the light source is used for providing a light beam, and an illumination beam is formed by the light beam through the light source module, wherein a chromaticity of the light beam falls within a first region in the CIE 1931 xy chromaticity coordinates, the first region is a region enclosed by four coordinate points, and values of the four coordinate points of the first region are (0.2535, 0.2160), (0.2656, 0.2590), (0.2795, 0.2590), and (0.2674, 0.2160), respectively;
   a viewing angle switching module, located on a transmission path of the illumination beam, and comprising:
      a first polarizer;
      a viewing angle adjusting layer; and
      a second polarizer, wherein the viewing angle adjusting layer is located between the first polarizer and the second polarizer; and
   a display module, located on the transmission path of the illumination beam, and comprising:
      a display layer; and
      a third polarizer, wherein the display layer is located between the second polarizer and the third polarizer, and a display beam is formed by the illumination beam through the display module and the viewing angle switching module,
   wherein a hue of at least one of the first polarizer, the second polarizer, and the third polarizer has a b* value in the CIE 1976 (L*, a*, b*) color space and the b* value is less than 1.

5. The display device according to claim 4, wherein the b* value ranges from −2.5 to 0.5.

6. The display device according to claim 1, wherein a hue of the first polarizer has a b* value in the CIE 1976 (L*, a*, b*) color space and the b* value is less than 1.

7. The display device according to claim 1, wherein the illumination beam sequentially passes through the viewing angle switching module and the display module to form the display beam, and the viewing angle switching module is used for switching a range of an emitted light viewing angle of the illumination beam, thereby changing a range of an emitted light viewing angle of the display beam.

8. The display device according to claim 1, wherein the light beam sequentially passes through the light source module, the display module and the viewing angle switching module to form the display beam, and the viewing angle switching module is used for switching a range of an emitted light viewing angle of the display beam.

9. A method for adjusting a chromaticity of a display beam, comprising:
   providing a light source module, a viewing angle switching module and a display module, wherein the light source module includes a light source, the viewing angle switching module includes a first polarizer, a viewing angle adjusting layer, and a second polarizer, and the display module includes a display layer and a third polarizer; and providing a light beam, wherein the light beam is provided by the light source, and a chromaticity of the light beam falls within a first region in the CIE 1931 xy chromaticity coordinates, the first region is a region enclosed by four coordinate points, and values of the four coordinate points of the first region respectively are (0.2535, 0.2160), (0.2656, 0.2590), (0.2795, 0.2590), and (0.2674, 0.2160), thereby forming a display beam through the light source module, the display module and the viewing angle switching module, and a chromaticity of the display beam falls within a standard region in the CIE 1931 xy chromaticity coordinates, the standard region is a region enclosed by four coordinate points, and values of the four coordinate points of the standard region respectively are (0.343, 0.359), (0.283, 0.359), (0.343, 0.299) and (0.283, 0.299) when the display beam is a white light.

* * * * *